Nov. 13, 1945.  G. B. POLLOCK  2,388,995
CAMERA CONSTRUCTION
Filed April 18, 1944   2 Sheets-Sheet 2

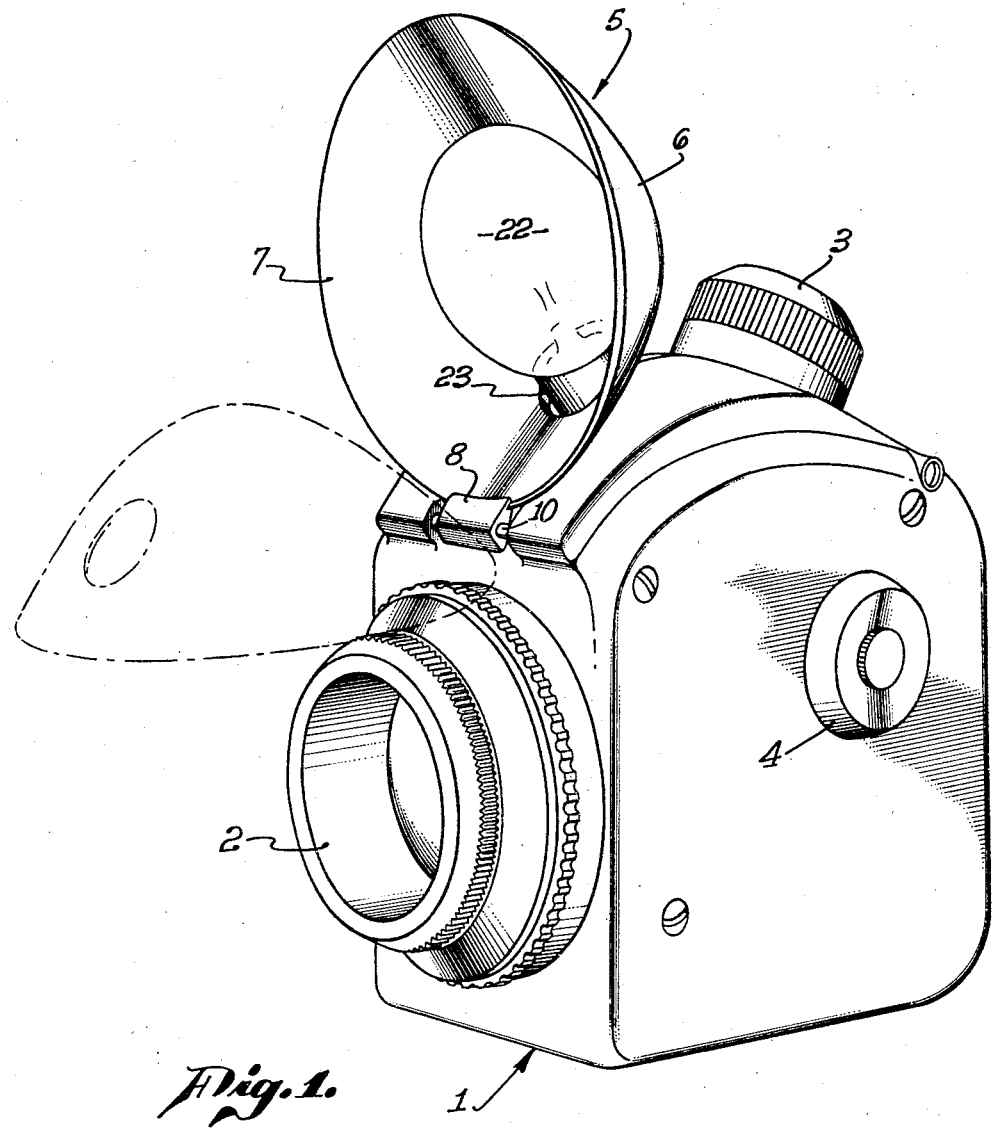

GORDON B. POLLOCK,
INVENTOR.

BY *Copeland*
ATTORNEY.

Patented Nov. 13, 1945

2,388,995

UNITED STATES PATENT OFFICE 2,388,995

CAMERA CONSTRUCTION

Gordon B. Pollock, South Laguna, Calif.

Application April 18, 1944, Serial No. 531,534

8 Claims. (Cl. 95—11)

This application pertains to a camera construction, and relates more particularly to a construction adapted for use in so-called "flash-photography," wherein the reflector element for the flash bulb is adapted to function equivalently but alternatively as a bulb-reflector, a lens shade, or a lens cover.

One of the particular objects of the invention is to provide a unitary and compact camera construction for use in "flash-photography" which is provided with a lamp reflector member pivotally mounted upon the camera base structure for movement between a position cooperating with the flash bulb to produce the desired reflector result, a position serving as a cover for the lens member of the camera structure, and, in effect, form the front of the camera in such position, and preferably to an intermediate position which will serve as a sunshade or "lens shade."

A further object of the invention is to provide a camera construction for use in flash photography in which the photoflash bulb is adapted to be mounted in a suitable receptacle in the camera body itself, and the bulb-reflector is movable into and out of an operating position with respect to such receptacle, in which the reflector member is caused to be locked in position with respect to said receptacle when a flash bulb is in place therein.

The device of this invention comprises, essentially, a concave reflector element pivotally mounted upon a camera in close relation to the camera lens element, in such position as to be movable into and out of a position in which the concave side of said reflector element is fitted over the camera lens element in a covering relation, and another position in which the concave side of said reflector element is faced forwardly in the direction of the field of view of said lens element. The construction is preferably further adapted to locate such reflector element at a position intermediate the above two positions, whereby it may be caused to serve as a sun shield or "lens shade" if desired. The construction further contemplates the use of the camera itself to provide the receptacle for the flash bulb which is to be associated with the reflector in a given photographic operation, and to provide an opening in the wall of the reflector through which the base of the bulb will extend in use. The reflector is placed in reflecting position, and the bulb-base is passed through the opening in the reflector into the receptacle in the camera and locked in place, thus locking the reflector in reflecting position.

Other objects and features of the invention will be brought out in the following description of a preferred embodiment, or will be apparent from such description. The accompanying drawings illustrate this preferred embodiment and referring thereto:

Fig. 1 is a perspective view of a camera device provided with a reflector assembly according to this invention, with the reflector shown in position ready to take a "flash" picture;

Figure 3:
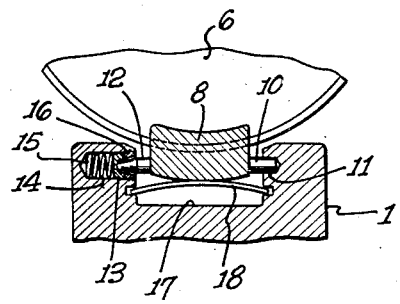
Fig. 3 is a sectional detail taken on line 3—3 in Fig. 2.

Referring to the drawings, a body portion of the camera is indicated generally at 1, provided with a lens mount 2. The form of camera illustrated may correspond generally to the type shown in my co-pending application Serial Number 398,186, filed June 16, 1941, entitled "Camera construction," but it will be appreciated that the features of the present invention are adaptable to other types of camera construction and the instant showing of a type of camera comparable to the one shown in the co-pending application is by way of example only. This camera is shown as provided with an eyepiece 3 for a view finder, and a shutter release knob 4, as described more particularly in the aforementioned application.

The construction is provided with a reflector assembly indicated generally at 5, comprising an outer convex reflector or cover element 6 rotatably mounted upon an inner concave reflector element 7, said inner reflector element being provided with a rim portion 7a which is bent backwardly upon the rim portion 6a of the outer cover member for the purpose of retaining the two reflector elements in position permitting relative rotation therebetween. The reflector assembly is provided with a base member 8 which is pivotally mounted on the body portion 1 in such manner as to provide for rotative pivotal movement of the entire reflector assembly from the full line position shown in Figs. 1 and 2 into a position substantially covering the lens mount 2 as shown in dot-dash lines at C in Fig. 2. The construction is preferably also so arranged as to provide for fixing the reflector assembly 5 in an intermediate position such as shown in dot-dash lines at S in Figs. 1 and 3, in which position it may serve as a "shade" for the lens carried in the lens mount 2. In the present construction it will be observed that the reflector assembly is mounted for rotation about an axis which is normally horizontal, being therefore mounted at a position above the lens mount 2, but the equivalence of mounting the construction at one side of the lens mount instead of above should be apparent to one skilled in the art.

The pivotal mounting for the reflector assembly 5 may be provided through the agency of the base member 8 secured to the rim portion 7a of the inner reflector member 7 as at 9 in any suitable manner, as by silver soldering, said base member being provided at one side with a cylindrical pivot pin 10 adapted to be engaged within a recess or bearing 11 formed in the body portion 1 of the camera, and at the other side by a tapered pin 12 adapted to be engaged by a bearing 13 on the camera portion 1 in alinement with the bearing 11. The bearing 13 is slidably disposed within a recess 14 in the body portion and is provided with a spring 15 adapted to bias the same outwardly, said bearing 13 being prevented from being pushed out of the recess 13 through the agency of a retaining nut 16. The body portion of the camera is conveniently recessed as at 17 intermediate the position of bearings 11 and 13, and within this space I provide a spring member 18 which is adapted to bear against the base member 8 and cause the same to adopt any one of the plurality of positions above described. For this purpose the base member 8 is provided with three flat faces or sides 8a, 8b, and 8c, against which the flat spring 18 will bear in the respective positions of the reflector.

Figure 2:
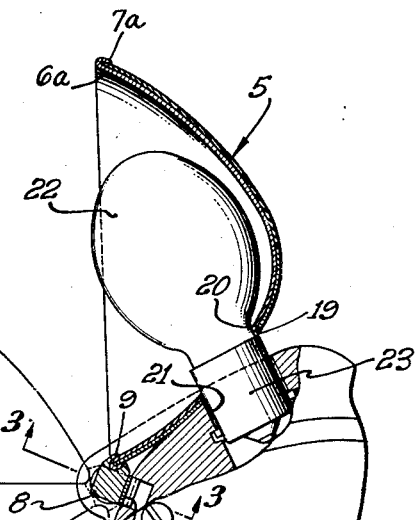
Fig. 2 is a fragmentary side elevation of the construction shown in Fig. 1 with a portion broken away to show the manner in which the reflector may be attached to the camera body.

In Figs. 1 and 2 the reflector assembly 5 is shown in position ready to produce illumination for a flash photograph, in conjunction with the flash bulb. For this purpose I provide two alined openings in the reflector assembly, an opening 19 in the outer cover element 6 and an opening 20 in the inner reflector element 7, both of said openings being coactingly positioned with respect to the bulb socket or receptacle 21 which is formed in the camera body portion 1. This bulb socket may be of the type adapted to receive a conventional flash bulb 22 provided with a bayonet type bulb base 23. With the reflector assembly 5 in the position shown in full lines in Fig. 2, the insertion of the bulb 22 as shown, and the proper locking of said bulb within the bayonet bulb socket 21, will serve to securely position the reflector in its raised or reflecting position. This provides a quite rugged construction which securely positions the reflector so that the beam of illumination resulting therefrom will always be directed to the proper location ahead of the camera.

Figure 4:
Fig. 4 is a side view of a form of reflector member which might be used in this invention, with a portion broken away to show the internal construction.

If it is desired to employ the camera as a conventional camera, wherein no flash bulb is used, the flash bulb 22 may be removed, thus unlocking the reflector assembly 5 from the full line position of Fig. 2. The spring 18 which bears against the face 8c of the reflector base 8 will retain the reflector in position, but it may readily be moved away from the full line position toward the lens covering position included in dot-dash lines at C. In this position the spring member 18 will bear against the face 8a of the reflector base 8 and retain the same in position against the camera body. The construction conveniently provides for the placement of the reflector assembly in a position such as to serve as a sun shield or "shade" for the lens carried by the mount 2, as indicated in dot-dash lines at S. In this position the reflector assembly will be held by the spring 18 bearing against the face 8d of the reflector base 8. When the reflector assembly 5 is employed in either of the positions indicated at C or S, it will be preferable to rotate the outer reflector member 6 to an extent such that the opening 19 is placed out of register with the opening 20. Such a rotated position of the outer reflector is indicated in Fig. 4.

The pivotal mounting for the reflector assembly 5 shown in the present embodiment permits ready removal of the reflector assembly from the camera body 1. As shown in Fig. 3, the base 8 of the reflector may be moved to the left (assuming there is no bulb 22 in the bulb socket 21), compressing the spring 15 within the recess 14 to an extent sufficient to permit the cylindrical pivot 10 to clear a bearing 11. A slight counterclockwise rotation of the reflector assembly followed by a movement of the entire assembly to the right will effect the removal. This construction permits the substitution of a different reflector should the photographic occasion warrant. For example, the reflector assembly shown at S is adapted for relatively close use; i. e. for illumination of a subject disposed at a relatively short distance from the position of the camera, and another reflector of greater light transmitting power may be substituted where more distant work is encountered.

I claim:

1. In a photographic camera assembly adapted for "flash" photography, the combination which comprises: a camera provided with a lens and a body portion, said body portion being provided with flash bulb retaining means adapted to position a flash bulb adjacent to but rearwardly of said lens; a concave reflector assembly provided with opening means adapted to receive a flash bulb base and having an edge portion pivotally mounted on said body portion at a position adjacent said lens and rotatable through an angle in the neighborhood of 180° between a first position removed from said flash bulb position and covering said lens and a second position such that the concavity is faced forwardly in the direction of the field of view of said lens, and is disposed generally rearwardly of said flash bulb position.

2. In a photographic camera assembly adapted for "flash" photography, the combination which comprises: a camera provided with a lens and a body portion; a concave reflector assembly provided with opening means adapted to receive a flash bulb base and having an edge portion provided with a base member; pivot means on said base member engaging said camera body portion at a position adjacent said lens, said reflector assembly being rotatable between a plurality of positions, in one of which said reflector assembly is disposed over said lens in a covering relation, and in another of which said reflector is disposed in an erect position adapted to receive a "flash" bulb for photography, and positioning means engaging said base member to cause said reflector to be restrained in any one of said plurality of positions.

3. In a photographic camera assembly adapted for "flash" photography, the combination which comprises: a camera provided with a lens and a body portion; a reflector assembly including an outer convex cover element and a relatively rotatable inner concave reflector element, said elements being provided with opening means adapted to receive a flash bulb base in one position of relative rotation; a base member secured to said reflector assembly; pivot means on said base member engaging said body portion at a position adjacent said lens, said reflector assembly being rotatable between a plurality of positions, in one of which said reflector assembly is disposed over said lens in a covering relation with said outer convex cover element directed forwardly, and in another of which said reflector is disposed in an erect position adapted to receive a "flash" bulb for photography and in which said inner concave reflector element is directed forwardly, and positioning means engaging said base member to cause said reflector to be restrained in any one of said plurality of positions.

4. In a photographic camera assembly adapted for "flash" photography, the combination which comprises: a camera provided with a lens and a body portion; said body portion being provided with a receptacle adapted to receive the base portion of a "flash" bulb and retain the same therein; a concave reflector assembly having an edge portion provided with a base member; pivot means on said base member engaging said camera body portion at a position adjacent said lens, said reflector assembly being rotatable between a plurality of positions, in one of which said reflector assembly is disposed over said lens in a covering relation, and in another of which said reflector is disposed in an erect position adapted to receive a "flash" bulb for photography, said reflector assembly being provided with a bulb-base receiving opening disposed in alinement with said receptacle when said reflector assembly is disposed in said other position, whereby said reflector assembly is retained in said other position through the agency of a "flash" bulb located in said receptacle.

5. In a photographic camera assembly adapted for "flash" photography, the combination which comprises: a camera provided with a lens and a body portion; a concave reflector assembly provided with opening means adapted to receive a flash bulb base and having an edge portion pivotally mounted on said body portion at a position adjacent said lens and rotatable through an angle in the neighborhood of 180° between a position covering said lens and another position such that the concavity is faced forwardly in the direction of the field of view of said lens; and positioning means engaging said reflector assembly to cause said reflector to be resiliently restrained in either of said positions.

6. In a photographic camera assembly adapted for "flash" photography, the combination which comprises: a camera provided with a lens and a body portion; a concave reflector assembly provided with opening means adapted to receive a flash bulb base and having an edge portion provided with a base member; pivot means on said base member engaging said camera body portion at a position adjacent said lens, said reflector assembly being rotatable between a plurality of positions, in one of which said reflector assembly is disposed over said lens in a covering relation, and in another of which said reflector is disposed in an erect position adapted to receive a "flash" bulb for photography, said base member being provided with a plurality of positioning edges corresponding to said plurality of positions, and spring means adapted to engage the respective positioning edges in the respective positions of said reflector assembly and resiliently bias said reflector in any one of said positions.

7. In a photographic camera assembly adapted for "flash" photography, the combination which comprises: a camera provided with a lens and a body portion; a reflector assembly including an outer convex cover element and a relatively rotatable inner concave reflector element, said elements being provided with opening means adapted to receive a flash bulb base in one position of relative rotation; a base member secured to said reflector assembly; pivot means on said base member engaging said body portion at a position adjacent said lens, said reflector assembly being rotatable between a plurality of positions, in one of which said reflector assembly is disposed over said lens in a covering relation with said outer convex cover element directed forwardly, and in another of which said reflector is disposed in an erect position adapted to receive a "flash" bulb for photography and in which said inner concave reflector element is directed forwardly, and positioning means engaging said base member to cause said reflector to be restrained in any one of said plurality of positions, and said body portion being provided with a receptacle adapted to receive the base portion of such "flash" bulb and retain the same therein, said receptacle being positioned in alined relation to said opening means in said reflector assembly when the latter is in said other position whereby said reflector assembly may be caused to be fixed in said other position through the agency of a "flash" bulb positioned in said receptacle.

8. In a photographic camera assembly adapted for "flash" photography, the combination which comprises: a camera provided with a lens and a body portion; a concave reflector assembly provided with opening means adapted to receive a flash bulb base and having an edge portion pivotally mounted on said body portion at a position adjacent but above said lens and adapted for rotation about a normally horizontal axis through an angle in the neighborhood of 180° between a position covering said lens, an intermediate position extending forwardly of said pivotal mounting, and another position such that the concavity is faced forwardly in the direction of the field of view of said lens, and detent means mounted on said body portion resiliently engaging said reflector assembly to restrain the same in any one of said positions.

GORDON B. POLLOCK.